US010349275B2

(12) United States Patent
Moreton et al.

(10) Patent No.: US 10,349,275 B2
(45) Date of Patent: Jul. 9, 2019

(54) SYSTEMS AND METHODS FOR TIERED AUTHENTICATION INCLUDING POSITION-BASED CREDENTIALS

(71) Applicant: Capital One Services, LLC, McLean, VA (US)

(72) Inventors: Paul Y Moreton, Glen Allen, VA (US); Ryan Fox, Lebanon, OH (US); Matthew Thompson, Alexandria, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 15/872,060

(22) Filed: Jan. 16, 2018

(65) Prior Publication Data
US 2019/0141528 A1    May 9, 2019

Related U.S. Application Data

(63) Continuation of application No. 15/806,905, filed on Nov. 8, 2017.

(51) Int. Cl.
*G06F 21/00* (2013.01)
*H04W 12/06* (2009.01)
(Continued)

(52) U.S. Cl.
CPC .......... *H04W 12/06* (2013.01); *H04L 63/083* (2013.01); *H04L 63/0853* (2013.01);
(Continued)

(58) Field of Classification Search
CPC ..... H04W 12/06; H04W 4/023; H04W 12/08; H04L 63/083; H04L 63/0853; H04L 63/107; H04L 63/0861; H04L 2463/082
See application file for complete search history.

(56) References Cited

U.S. PATENT DOCUMENTS 9,075,979 B1    7/2015 Queru
2010/0317323 A1    12/2010 Facemire et al.
(Continued)

FOREIGN PATENT DOCUMENTS

EP    2916520 A1 *  9/2015  ............ H04W 4/029

OTHER PUBLICATIONS

European Search Report dated Mar. 19, 2019 for EP Appl. No. 18205037.7, 8 pages.

*Primary Examiner* — Kendall Dolly
(74) *Attorney, Agent, or Firm* — Finnegan, Henderson, Farabow, Garrett & Dunner LLP

(57) ABSTRACT

The present disclosure relates to systems and methods for implementing tiered authentication using position based credentials. In one implementation, a system for associating two user interface devices to provide position-based authentication for a user may include one or more memories storing instructions and one or more processors configured to execute the instructions to perform operations. The operations may include receiving a first identity associated with a first user interface device, receiving a second identity associated with a second user interface device, receiving credentials associated with the user, receiving a distance threshold, and establishing a credentialing association between the first identity and the second identity based on the credentials and the distance threshold.

20 Claims, 8 Drawing Sheets

(51) Int. Cl.
*H04L 29/06* (2006.01)
*H04W 4/02* (2018.01)
*H04W 12/08* (2009.01)

(52) U.S. Cl.
CPC ........ *H04L 63/0861* (2013.01); *H04L 63/107* (2013.01); *H04W 4/023* (2013.01); *H04W 12/08* (2013.01); *H04L 2463/082* (2013.01)

(56) References Cited

U.S. PATENT DOCUMENTS

| | | | |
|---|---|---|---|
| 2012/0003933 A1* | 1/2012 | Baker | H04W 76/38 |
| | | | 455/41.2 |
| 2014/0282897 A1* | 9/2014 | Stuntebeck | H04L 63/08 |
| | | | 726/4 |
| 2017/0085565 A1* | 3/2017 | Sheller | H04L 63/0876 |
| 2017/0181115 A1 | 6/2017 | Kim et al. | |
| 2017/0220940 A1* | 8/2017 | Shaashua | G06N 5/04 |

* cited by examiner

SYSTEMS AND METHODS FOR TIERED AUTHENTICATION INCLUDING POSITION-BASED CREDENTIALS

CROSS-REFERENCE TO RELATED APPLICATIONS

This application is a continuation of U.S. application Ser. No. 15/806,905, filed Nov. 8, 2017, the contents of which are incorporated herein by reference in their entirety.

TECHNICAL FIELD

This disclosure relates generally to the field of user authentication and authorization. More specifically, and without limitation, this disclosure relates to systems and methods for implementing tiered authentication using position-based credentials.

BACKGROUND

To access secure areas available on a computer network, such as a company intranet or private areas of a public website, users generally have to enter credentials. However, entering credentials each time may be tedious and time-consuming to the users. Extant solutions to this problem include, for example, password managers. However, password managers often require a master password. In addition, password managers often suffer from vulnerabilities. For example, encrypted passwords stored by the password manager may all be accessed if only the master password is cracked. In another example, password managers that auto-complete login requests may be used by malicious parties if a user's interface device (such as a laptop, tablet, or smartphone) is stolen and subsequently unlocked.

Furthermore, single sign-on suffers from similar vulnerability. For example, access to all resources encompassed by the authorization token may be gained if only one password is cracked. In addition, single sign-on requires centralized authorization servers. Many institutions may be unwilling to offer single sign-on because the safety and reliability of their systems may then depend on other parties managing at least some of the authorization servers.

SUMMARY

Disclosed systems and methods for implementing tiered authentication using position-based credentials may permit for easier authentication from a user perspective while simultaneously maintaining a high level of security. For example, position-based credentials described herein may depend on unique (or quasi-unique) identities of at least two user interface devices, which may be more secure than a traditional password or extant two-factor authorization techniques. Moreover, the use of identities and positions of devices to authorize a user allows for a more passive authentication process than extant passwords and two-factor authorization techniques.

There are many possible applications for such capabilities. Examples of applications include authentication of users on an intranet or other private network. Additional examples of application may include authentication of users to access private (and/or secure) areas of a public website.

Certain embodiments of the present disclosure include or use one or more user interface devices. As used herein, "user interface device" refers to any device capable of performing computer processing functions and receiving input from a user of the device. For example, a "user interface device" may receive input from a keyboard, a mouse, a joystick, a touchscreen, a microphone (e.g., via voice commands), or other input device. Generally, a "user interface device" may connect to at least one computer network, such as a local area network (LAN), a cellular network (such as 4G, long-term evolution (LTE), or the like), the Internet, or the like.

According to an exemplary embodiment of the present disclosure, a system for authenticating a user with position-based credentials may comprise one or more memories storing instructions and one or more processors configured to execute the instructions to perform operations. The operations may comprise receiving a login request associated with the user from a first user interface device, receiving a first location associated with the first user interface device, and receiving a second location associated with a second user interface device. The second user interface device may have an identity associated with an identity of the first user interface device. The operations may further comprise, when a Lebesgue distance between the first location and the second location is below a first threshold: authenticating the user; when the Lebesgue distance is above the first threshold and below a second, larger threshold: prompting the first interface device for a first credential, and when the Lebesgue distance is above the second threshold: prompting the first interface device for a second credential.

According to another embodiment of the present disclosure, a method for authenticating a user with position-based credentials may comprise receiving a login request associated with the user from a first user interface device, receiving a first location associated with the first user interface device, and receiving a second location associated with a second user interface device. The second user interface device may have an identity associated with an identity of the first user interface device. The method may further comprise, when a Lebesgue distance between the first location and the second location is below a first threshold: authenticating the user; when the Lebesgue distance is above the first threshold and below a second, larger threshold: prompting the first interface device for a first credential, and when the Lebesgue distance is above the second threshold: prompting the first interface device for a second credential.

According to an exemplary embodiment of the present disclosure, a system for associating two user interface devices to provide position-based authentication for a user may comprise one or more memories storing instructions and one or more processors configured to execute the instructions to perform operations. The operations may comprise receiving a first identity associated with a first user interface device, receiving a second identity associated with a second user interface device, receiving credentials associated with the user, receiving at least one distance threshold, and establishing a credentialing association between the first identity and the second identity associated with the credentials and the at least one distance threshold.

According to another embodiment of the present disclosure, a method for associating two user interface devices to provide position-based authentication for a user may comprise receiving a first identity associated with a first user interface device, receiving a second identity associated with a second user interface device, receiving credentials associated with the user, receive at least one distance threshold, and establishing a credentialing association between the first identity and the second identity associated with the credentials and the at least one distance threshold.

Additional embodiments of the present disclosure include non-transitory computer-readable media storing instructions that cause one or more processors to execute any of the methods disclosed herein.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
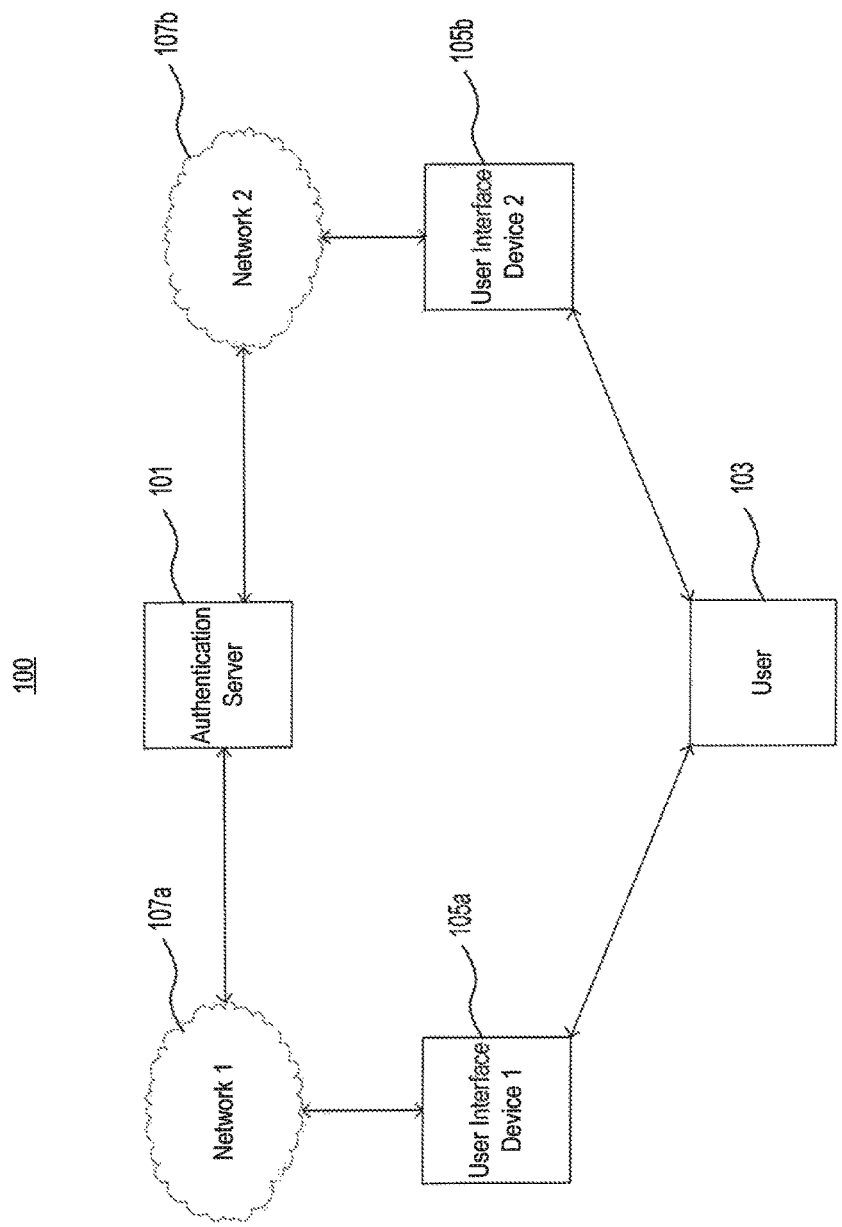
FIG. 1 is a schematic representation of an example system for implementing tiered authentication using position-based credentials, consistent with embodiments of the present disclosure.

The disclosed embodiments relate to systems and methods for implementing tiered authentication using position-based credentials. Embodiments of the present disclosure may be implemented using one or more general purpose computers, e.g., one or more servers, one or more user interface devices, or the like. Alternatively or concurrently, one or more special purpose computer may be built according to embodiments of the present disclosure using suitable circuit elements, e.g., one or more application-specific integrated circuits or the like.

As used herein, the term "distance" may connote a Lebesgue distance between two points in any generalized space. For example, a Lebesgue distance between two geographic locations may comprise a Euclidean distance between the locations or a rectilinear distance between the locations. In addition, the term "distance" may connote a relative distance, such as the number of floors between two locations in the same building, or whether one location is in the same neighborhood or non-radial vicinity of another location.

According to an aspect of the present disclosure, a system for authenticating a user with position-based credentials may comprise at least one processor configured to execute instructions and at least one memory storing the instructions.

In some embodiments, the processor may receive a login request associated with the user from a first user interface device. The first user interface device may comprise, for example, a laptop computer, a desktop computer, a smartphone, a tablet, or the like. In certain aspects, the processor may receive the login request over a first computer network. For example, the first computer network may comprise a local area network (LAN), a cellular network (e.g., 4G, LTE, or the like), the Internet, or the like. In some embodiments, the first computer network may comprise a plurality of networks. For example, the login request may be sent via LTE and then through the Internet to the processor. By way of further example, the login request may be sent over the Internet and then through a LAN to the processor.

The login request may comprise a request for access to one or more private resources. For example, the login request may comprise a request to access an intranet or other private computer network. By way of further example, the login request may comprise a request to access a private area of a public website. In this example, the private area may comprise a portion of the dark web, such as a members-only or subscribers-only area of a website that requires the user to have purchased access (that is, is hidden behind a paywall), a private online banking portion of a website, a private email portion of a website, or the like.

In some embodiments, the processor may receive a first location associated with the first user interface device. For example, the location may comprise geographic coordinates (optionally with a margin of error) of the first user interface device. In another example, the location may comprise a physical address (optionally with a margin of error) near which the first user interface device is located. In this example, the physical address may comprise the address with the shortest Euclidean distance from the first user interface device. Alternatively, the physical address may comprise an estimated address of a virtual building located at the first user interface device.

The first user interface device may calculate the first location and send it to the processor. For example, the first user interface device may include a global positioning system (GPS) locator or other locating device and derive the first location therefrom. Alternatively or concurrently, the first user interface device may use computer network data, such as an internet protocol (IP) address, and derive the first location therefrom. The computer network data may be based on one or more cellular networks (such as 4G or the like) and/or nearby wired and/or wireless connections (such as WiFi, Ethernet, or the like).

The first location may be two-dimensional. Alternatively, the first location may be three-dimensional. In such embodiments, for example, the first user interface device may include an altimeter or other device measuring height in order to derive a three-dimensional position of the first user interface device.

In other embodiments, the processor may receive data from the first user interface device and calculate the first location therefrom. For example, the processor may receive GPS data, altimeter data, computer network data, or the like, and derive the first location therefrom.

The first location and/or the data used to calculate the first location may be sent over the first computer network. Alternatively or concurrently, the first location and/or the data used to calculate the first location may be sent over a second computer network. For example, the second computer network may comprise a local area network (LAN), a cellular network (e.g., 4G, LTE, or the like), the Internet, or the like. In some embodiments, the second computer network may be at least partially separate from the first computer network. For example, the first computer network may comprise a 4G network coupled to the Internet, and the second computer network may comprise a WiFi network coupled to the Internet. In certain aspects, the second computer network may be fully separate from the first computer network. For example, the first computer network may comprise the Internet, and the second computer network may comprise a LAN.

In certain aspects, the first location and/or the data used to calculate the first location may be sent concurrently with the login request (or immediately after or immediately before). Alternatively, the first location and/or the data used to calculate the first location may be sent separately from the login request.

In some embodiments, the processor may receive a second location associated with a second user interface device. The second user interface device may comprise, for example, a laptop computer, a desktop computer, a smartphone, a tablet, or the like. The embodiments discussed above with respect to the first location and/or the data used to calculate the first location apply similarly to the second location and/or the data used to calculate the second location.

In certain aspects, the processor may receive the second location over a third computer network. For example, the third computer network may comprise a local area network (LAN), a cellular network (e.g., 4G, LTE, or the like), the Internet, or the like. In some embodiments, the third computer network may be at least partially separate from the first computer network and/or the second computer network. For example, the third computer network may comprise an LTE network coupled to the Internet, and the second computer network and/or the first computer network may comprise a LAN coupled to the Internet. In certain aspects, the third computer network may be fully separate from the first computer network and/or the second computer network. For example, the third computer network may comprise a LAN, and the second computer network and/or the first computer network may comprise Bluetooth coupled to the Internet.

In certain aspects, at least one of the first computer network, the second computer network, or the third computer network may comprise the same network. For example, the processor may receive the login request and the first location over the same computer network.

In certain aspects, the second user interface device may have an identity associated with an identity of the first user interface device. As used herein, "identity" refers to one or more unique or quasi-unique identifiers of a user interface device.

Unique identifiers may include a media access control (MAC) address of a network interface card (NIC) included in the user interface device, a serial number of a hardware device included in the user interface device, a universally unique identifier (UUID), or the like. Hardware devices having a serial number may include a motherboard, a non-volatile memory such as a hard disk drive or a solid state drive, a processor such as a central processing unit (CPU) or graphics processing unit (GPU), a volatile memory such as random access memory (RAM), a display such as a touchscreen or monitor, or the like. A UUID may be generated by the user interface device itself, by the processor, or by a third party (such as Microsoft®).

Quasi-unique identifiers may include an Internet protocol (IP) address used by the user interface device, a machine name, or the like. In some embodiments, an application installed on the user interface device may include a code, a password, an authorization key, or other credentials comprising a unique or quasi-unique identifier associated with the user interface device. For example, the application may comprise a plugin for a web browser installed on the user interface device. Alternatively or concurrently, a cookie, temporary file, or other stored data may include a code, a password, an authorization key, or other credentials comprising a unique or quasi-unique identifier associated with the user interface device.

In some embodiments, when a Lebesgue distance between the first location and the second location is below a first threshold, the processor may authenticate the user. For example, the processor may calculate the distance between the first location and the second location as Euclidean distance (e.g., 5 feet, 20 meters, or the like). Alternatively, the processor may calculate the distance between the first location and the second location as rectilinear distance (e.g., 1 mile by walking, 500 feet by vehicle, 5 city blocks away, or the like). Alternatively, the processor may calculate the distance as a Boolean value. For example, the Boolean may indicate whether the first location and the second location are within the same neighborhood, the same building, the same floor, or other predetermined geographic area.

In some embodiments, when the Lebesgue distance is above the first threshold and below a second, larger threshold, the processor may prompt the first interface device for a first credential. Alternatively or concurrently, the processor may prompt the second interface device for the first credential.

The first credential may comprise a username and a password associated with the user. Alternatively or concurrently, the first credential may comprise at least one biometric associated with the user. In certain aspects, the first credential may comprise a passcode or passphrase associated with the user. Similarly, the first credential may comprise one or more answers to one or more secret questions.

In certain aspects, the processor may transmit a code to the first user interface device and/or the second user interface device. The processor may then prompt the first user interface device and/or the second user interface device for the transmitted code as the first credential.

In some embodiments, when the Lebesgue distance is above the second threshold, the processor may prompt the first interface device for a second credential. Alternatively or concurrently, the processor may prompt the second interface device for the second credential.

The second credential may comprise a username and a password associated with the user. Alternatively or concurrently, the second credential may comprise at least one biometric associated with the user. In certain aspects, the second credential may comprise one or more answers to one or more secret questions.

In certain aspects, the processor may transmit a code to the first user interface device and/or the second user interface device. The processor may then prompt the first user interface device and/or the second user interface device for the transmitted code as the second credential.

In certain aspects, the first credential may be less robust than the second credential. For example, the first credential may comprise a passcode or passphrase associated with the user, and the second credential may comprise a username and password. In another example, the first credential may comprise a code transmitted to the first user interface device and/or the second user interface device, and the second credential may comprise at least one biometric. In yet another example, the first credential may comprise a single credential (e.g., a passcode, a passphrase, a code transmitted to the first user interface device and/or the second user interface device, etc.), and the second credential may comprise a combination of credentials (e.g., a username and password coupled with at least one biometric, a username and password coupled with a code transmitted to the first user interface device and/or the second user interface device, at least one biometric coupled with an answer to a secret question, etc.). Accordingly, the second credential may be used in a two-factor authentication procedure.

The processor may thus authenticate the user based on the Lebesgue distance between the first location and the second location. Depending on the Lebesgue distance, the authentication may be automatic or may require the first credential or the second credential to be received by and verified by the processor.

In certain aspects, the processor may receive the first identity and/or the second identity in addition to the first location and the second location. In such aspects, the authentication may be further based on the first identity and/or the second identity in addition to the Lebesgue distance (and, in some embodiments, the first credential or the second credential).

According to another aspect of the present disclosure, a system for associating two user interface devices to provide position-based authentication for a user may comprise at least one processor configured to execute instructions and at least one memory storing the instructions.

In some embodiments, the processor may receive a first identity associated with a first user interface device. The first user interface device may comprise, for example, a laptop computer, a desktop computer, a smartphone, a tablet, or the like. In certain aspects, the processor may receive the first identity over a first computer network. For example, the first computer network may comprise a local area network (LAN), a cellular network (e.g., 4G, LTE, or the like), the Internet, or the like. In some embodiments, the first computer network may comprise a plurality of networks. For example, the first identity may be sent via LTE and then through the Internet to the processor. By way of further example, the first identity may be sent over the Internet and then through a LAN to the processor.

As described above, the first identity may comprise one or more unique or quasi-unique identifiers of the first user interface device. For example, unique identifiers may include a MAC address of an NIC included in the first user interface device, a serial number of a hardware device included in the first user interface device, a UUID associated with the first user interface device, or the like. Hardware devices having a serial number may include a motherboard, a non-volatile memory such as a hard disk drive or a solid state drive, a processor such as a CPU or GPU, a volatile memory such as RAM, a display such as a touchscreen or monitor, or the like. A UUID associated with the first user interface device may be generated by the first user interface device or by a third party (such as Microsoft®). Alternatively, the processor may generate the UUID and assign it to the first user interface device. In another example, quasi-unique identifiers may include an IP address used by the first user interface device, a machine name of the first user interface device, or the like.

In some embodiments, an application installed on the first user interface device may include a code, a password, an authorization key, or other credentials comprising a unique or quasi-unique identifier associated with the first user interface device. For example, the application may comprise a plugin for a web browser installed on the first user interface device. Alternatively or concurrently, a cookie, temporary file, or other data stored on the first user interface device may include a code, a password, an authorization key, or other credentials comprising a unique or quasi-unique identifier associated with the first user interface device. For example, a web browser or other application installed on the first user interface device may access and/or transmit the stored data to send the identity to the processor In some embodiments, the processor may receive a second identity associated with a second user interface device. The second user interface device may comprise, for example, a laptop computer, a desktop computer, a smartphone, a tablet, or the like. In certain aspects, the processor may receive the second identity over the first computer network. Alternatively or concurrently, the second identity may be received over a second computer network. For example, the second computer network may comprise a local area network (LAN), a cellular network (e.g., 4G, LTE, or the like), the Internet, or the like. In some embodiments, the second computer network may be at least partially separate from the first computer network. For example, the first computer network may comprise a 4G network coupled to the Internet, and the second computer network may comprise a WiFi network coupled to the Internet. In certain aspects, the second computer network may be fully separate from the first computer network. For example, the first computer network may comprise the Internet, and the second computer network may comprise a LAN.

In certain aspects, the first identity may be sent concurrently with the second identity (or immediately after or immediately before). Alternatively, the first identity may be sent separately from the second identity.

In some embodiments, the processor may receive credentials associated with the user. The credentials may, in certain aspects, be received from the first user interface device and/or the second user interface device. For example, credentials may comprise a username and a password, at least one biometric, a passcode or passphrase, one or more answers to one or more secret questions, or the like. In certain aspects, the processor may transmit a code to the first user interface device and/or the second user interface device. The processor may then prompt the first user interface device and/or the second user interface device for the transmitted code as the credentials.

In certain aspects, the credentials may be sent concurrently with the first identity and/or the second identity (or immediately after or immediately before). Alternatively, the credentials may be sent separately from the first identity and the second identity. For example, the processor may prompt the user for the credentials after receiving the first identity and/or the second identity.

In some embodiments, the processor may receive at least one distance threshold. The at least one distance threshold may, in certain aspects, be received from the first user interface device and/or the second user interface device. The at least one distance threshold may comprise a Euclidean distance (e.g., 20 feet, 300 meters, or the like), a rectilinear distance (e.g., 1 mile as the crow flies, 2 miles via public roads, or the like), or a set of one or more conditions. For example, the one or more conditions may include whether locations are within the same city, the same county, the same floor of a building, or other predetermined geographic area.

In certain aspects, the at least one distance threshold may be sent concurrently with the credentials and/or the first identity and/or the second identity (or immediately after or immediately before). Alternatively, the at least one distance may be sent separately from the credentials, the first identity, and the second identity. For example, the processor may prompt the user for the at least one distance threshold after receiving the credentials and/or the first identity and/or the second identity.

In some embodiments, the processor may establish a credentialing association between the first identity and the second identity associated with the credentials and the at least one distance threshold. For example, the processor may store the first identity and the second identity with the at least one distance threshold in a database indexed by users. One or more of the portions of such a database may be encrypted. Future authentications of the user may then utilize the database to query received locations and/or identities against the stored information.

Embodiments of the present disclosure also relate to methods and computer-readable media that implement the above embodiments.

Reference will now be made in detail to exemplary embodiments and aspects of the present disclosure, examples of which are illustrated in the accompanying drawings.

FIG. 1 is a schematic representation of example system 100 for implementing tiered authentication using position-based credentials. System 100 may include an authentication server 101. For example, authentication server 101 may comprise server 800 of FIG. 8. Although depicted as a single entity in FIG. 1, authentication server 101 may comprise a plurality of servers, whether residing on a single server farm or a plurality of server farms.

Authentication server 101 may authenticate a user 103. For example, user 103 may connect to authentication server 101 via a user interface device 105*a* and a user interface device 105*b*. User interface device 105*a* and/or user interface device 105*b* may comprise at least one of a smartphone, a tablet, and a personal computer (such as a laptop computer or a desktop computer).

Authentication server 101 may send and receive data over computer networks, e.g., a network 107*a* and a network 107*b*. Network 107*a* and/or network 107*b* may comprise a single network (such as a LAN or the Internet) or may comprise a plurality of networks linked together (such as a WiFi network linked to a LAN, an LTE network linked to the Internet, or the like). Although depicted as fully separate in FIG. 1, network 107*a* and network 107*b* may be at least partially overlapping. For example, network 107*a* may comprise a cellular network (such as 4G, LTE, or the like) coupled to the Internet, and network 107*b* may comprise a WiFi network or a LAN coupled to the Internet.

Figure 2:
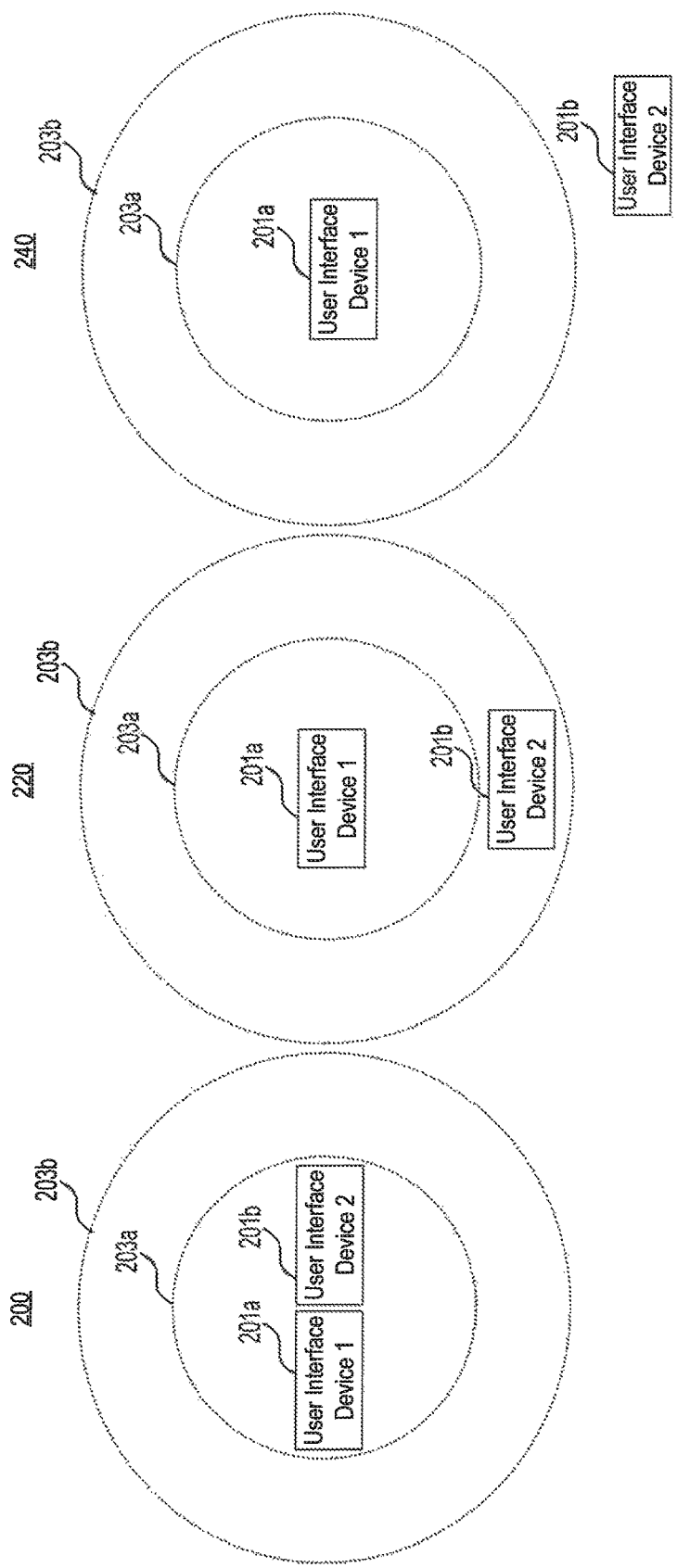
FIG. 2A is a schematic representation of an example positioning schema for radially-based tiered authentication, consistent with embodiments of the present disclosure.
FIG. 2B is a schematic representation of another example positioning schema for radially-based tiered authentication based on distance, consistent with embodiments of the present disclosure.
FIG. 2C is a schematic representation of a third example positioning schema for radially-based tiered authentication based on distance, consistent with embodiments of the present disclosure.

FIGS. 2A-2C depict exemplary positioning schemata for radially-based tiered authentication. In a schema 200 of FIG. 2A, a user interface device 201*b* is located within a first threshold 203*a* and within a second threshold 203*b* of a user interface device 201*a*. In such an example, system 100 of FIG. 1 may authenticate the user without a first credential or a second credential, as explained above.

In example schema 220 of FIG. 2B, user interface device 201*b* is located without first threshold 203*a* but within second threshold 203*b* of user interface device 201*a*. In such an example, system 100 of FIG. 1 may prompt the user for a first credential prior to authentication. For example, the first credential may comprise a username and password, a passcode or passphrase, a code sent to at least one of user interface device 201*a* and/or user interface device 201*b*, or the like.

In example schema 240 of FIG. 2C, user interface device 201*b* is located without first threshold 203*a* and without second threshold 203*b* of user interface device 201*a*. In such an example, system 100 of FIG. 1 may prompt the user for a second credential prior to authentication. For example, the second credential may comprise a username and password, at least one biometric, an answer to a secret question, or the like.

Figure 3:
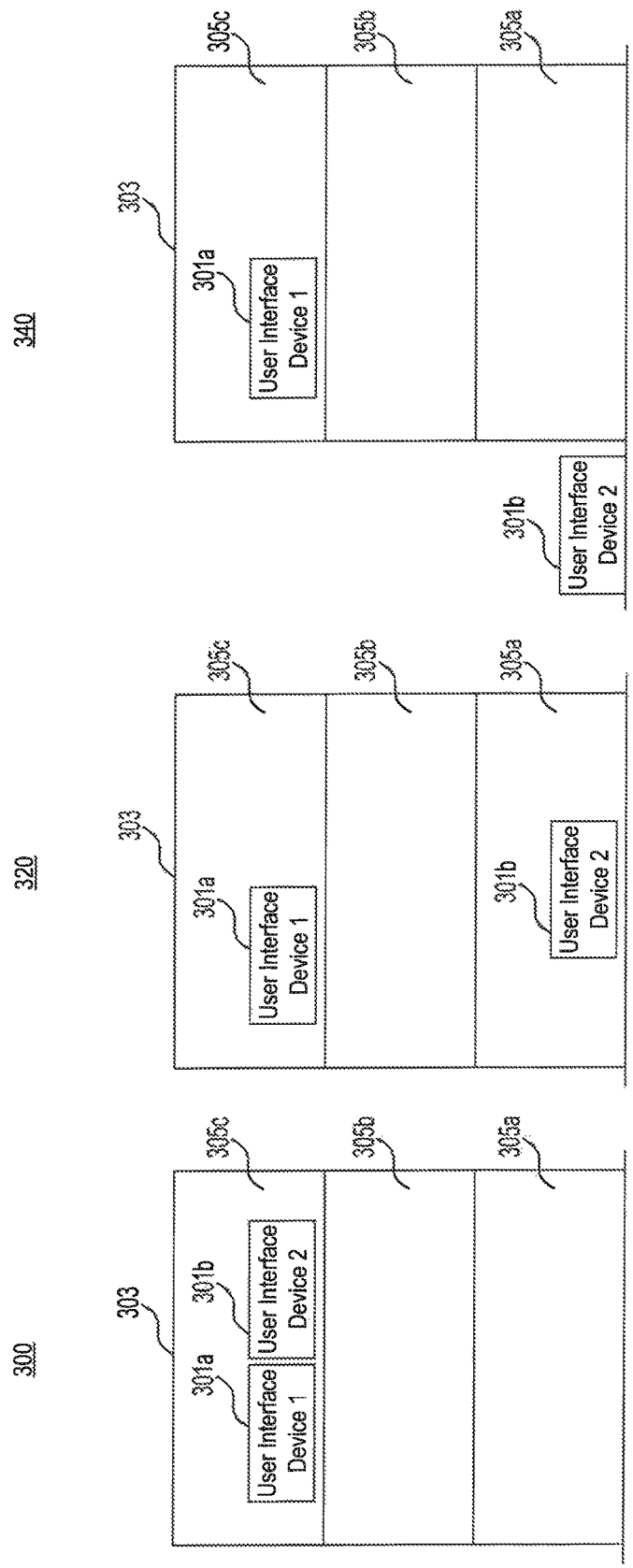
FIG. 3A is a schematic representation of an example positioning schema for landmark-based tiered authentication, consistent with embodiments of the present disclosure.
FIG. 3B is a schematic representation of another example positioning schema for landmark-based tiered authentication, consistent with embodiments of the present disclosure.
FIG. 3C is a schematic representation of a third example positioning schema for landmark-based tiered authentication, consistent with embodiments of the present disclosure.

Although depicted as circular thresholds in FIGS. 2A-2C, other threshold patterns may be used. For example, FIGS. 3A-3C depict exemplary positioning schemata for landmark-based tiered authentication. In a schema 300 of FIG. 3A, a user interface device 301*b* is located within a building 303 and on a floor 305*c* of building 303 along with user interface device 301*a*. In such an example, system 100 of FIG. 1 may authenticate the user without a first credential or a second credential, as explained above.

In a schema 320 of FIG. 3B, a user interface device 301*b* is located within building 303 along with user interface device 301*a* but is located on a floor 305*a* while user interface device 301*a* is located on floor 305*c*. In such an example, system 100 of FIG. 1 may prompt the user for a first credential prior to authentication. For example, the first credential may comprise a username and password, a passcode or passphrase, a code sent to at least one of user interface device 301*a* and/or user interface device 301*b*, or the like.

In example schema 340 of FIG. 3C, user interface device 301*b* is located outside building 303 while user interface device 301*a* is inside building 303. In such an example, system 100 of FIG. 1 may prompt the user for a second credential prior to authentication. For example, the second credential may comprise a username and password, at least one biometric, an answer to a secret question, or the like.

Although FIGS. 2A-2C depict radially-based schema, and FIGS. 3A-3C depict landmark-based schema, other schema are possible. For example, as described above, neighborhood-based schema may be employed, such that system 100 may authenticate a user when the first user interface device and the second user interface device are in the same neighborhood (or other geographically-defined area), may prompt the user for a first credential when the first user interface device and the second user interface device are in nearby neighborhoods (or any other pair of neighborhoods defined for intermediate scrutiny), and may prompt the user for a second credential when the first user interface device and the second user interface device are in far away neighborhoods (or any other pair of neighborhoods defined for higher scrutiny).

In a similar example, travel-based schema may be employed. For example, system 100 may authenticate a user when the first user interface device and the second user interface device are within a first threshold of travel time of each other, as defined by one or more modes of transportation (e.g., as the crow flies, via car, via public transit, via walking, etc.); may prompt the user for a first credential when the first user interface device and the second user interface device are outside the first threshold but within a second (higher) threshold; and may prompt the user for a second credential when the first user interface device and the second user interface device are outside the second threshold.

Figure 4:
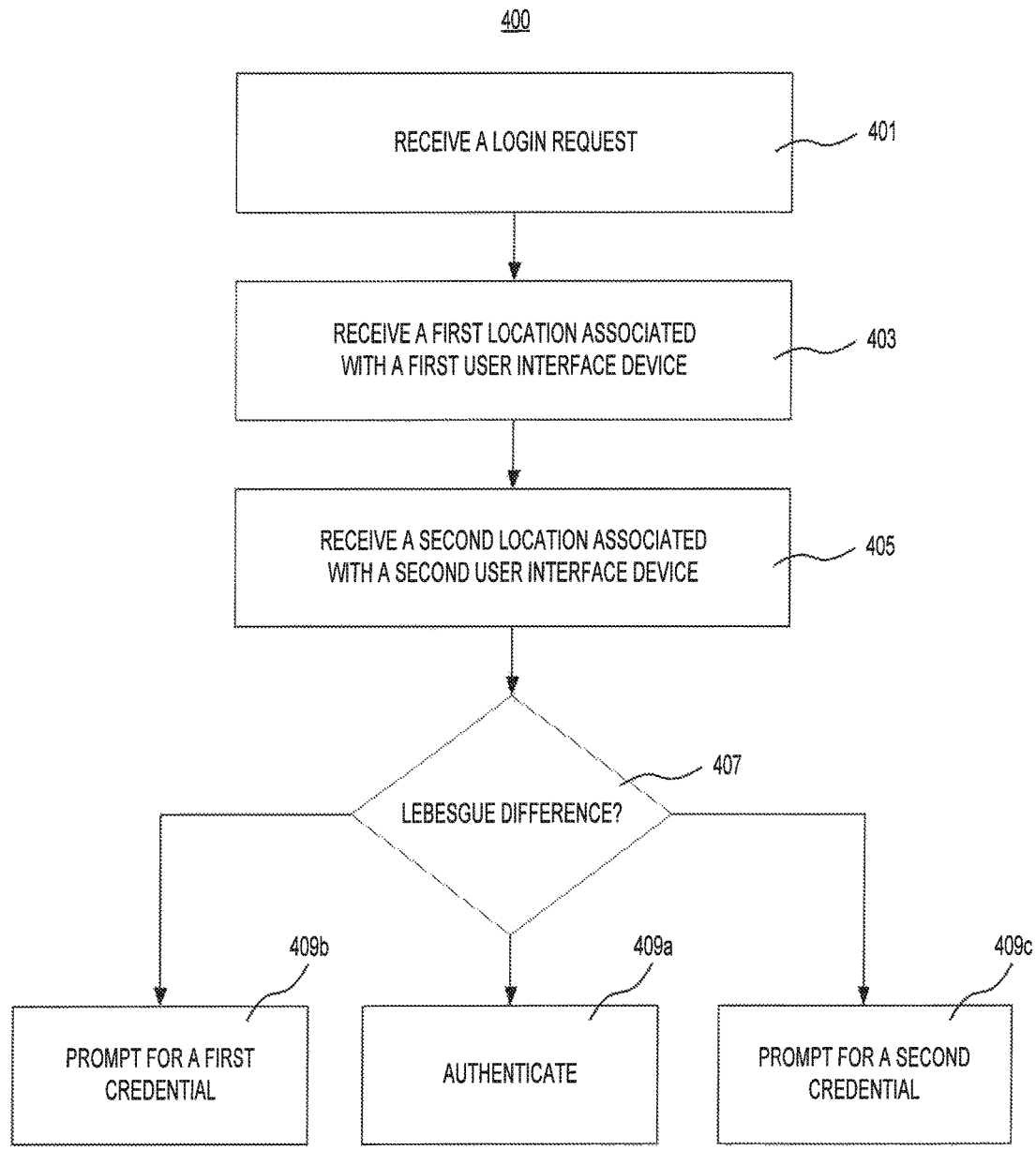
FIG. 4 is a flowchart of an exemplary method for authenticating a user with position-based credentials, consistent with embodiments of the present disclosure.

FIG. 4 is a flowchart of an exemplary method 400 for authenticating a user with position-based credentials. Method 400 may be implemented by, for example, one or more processors of authentication server 101 of FIG. 1 and/or a server 800 of FIG. 8. Method 400 may further be implemented using a general purpose computer or special purpose computer having at least one processor.

At step 401, the processor receives a login request associated with the user from a first user interface device. For example, the first user interface device may comprise at least one of a smartphone, a tablet, or a personal computer. The login request may be received over one or more computer networks, such as a LAN, 4G, LTE, WiFi, the Internet, or the like.

At step 403, the processor receives a first location associated with the first user interface device. For example, the first user interface device may calculate the first location and send it to the processor. In such an example, the first user interface device may use data from a GPS locator, data about cellular networks and/or nearby wireless networks such as WiFi, data from one or more social networking sites, or any other appropriate data, whether individually or in combination to determine the first location. The determination may also include a margin of error associated with the first location (e.g., ±5 meters, ±2 city blocks, or the like).

Alternatively or concurrently, the processor may receive data from the first user interface device such that the processor calculates the first location from the received data. For example, data from a GPS locator, data about cellular networks and/or nearby wireless networks such as WiFi, data from one or more social networking sites, or any other appropriate data may be sent to the processor. The processor may also determine a margin of error associated with the calculated first location (e.g., ±5 meters, ±2 city blocks, or the like).

At step 405, the processor receives a second location associated with a second user interface device. For example, the second user interface device may comprise at least one of a smartphone, a tablet, or a personal computer. The second user interface device may have an identity associated with an identity of the first user interface device. Similar to the first location, the second location may be calculated by the second user interface device and sent to the processor and/or may be calculated by the processor based on data received from the second user interface device.

In one example, at least one of the first location and the second location may be determined using an Internet protocol (IP) address of the associated user interface device. In this example, the associated user interface device may determinate the location from the IP address and/or the processor may receive the IP address from the associated user interface device and determine the location.

In another example, as explained above, at least one of the first location and the second location may be determined using data from a global positioning system locator of the associated user interface device. In this example, the associated user interface device may determinate the location from the GPS data and/or the processor may receive the GPS data from the associated user interface device and determine the location.

Steps 403 and 405 may use one or more computers networks for transmission of the first location and the second location. For example, the first location may be received over a first computer network, and the second location may be received over a second computer network. In some embodiments, the second computer network may be at least partially separate from the first computer network. For example, the first computer network may comprise a 4G network or an LTE network connected to the Internet, and the second computer network may comprise a LAN or a WiFi network connected to the Internet.

At step 407, the processor determines a Lebesgue distance between the first location and the second location. For example, the Lebesgue distance may comprise a Euclidean distance between the first location and the second location, a rectilinear distance between the first location and the second location (e.g., based on mode of transportation and/or city layout), other relative distances such as the number of floors between the first location and the second location if both locations are in the same building, geofencing-based distances such as whether the first location is in the same neighborhood, city, county, province, etc. as the second location is.

Method 400 may then trifurcate. For example, at step 409a, when the Lebesgue distance is below a first threshold, the processor authenticates the user. In addition, at step 409b, when the Lebesgue distance is above the first threshold and below a second, larger threshold, the processor prompts the first interface device for a first credential. Further, at step 409c, when the Lebesgue distance is above the second threshold, the processor prompts the first interface device for a second credential.

As explained above, the first credential may comprise a username and a password associated with the user. Alternatively or additionally, the first credential may comprise at least one biometric associated with the user. Alternatively or additionally, the first credential may comprise at least one of a passcode or a passphrase associated with the user.

In some embodiments, the processor may send a code to the second interface device and/or to the first interface device. For example, the code may comprise a numeric code, an alphanumeric code, or other string of characters. In certain aspects, the processor may send the code when the Lebesgue distance is above the first threshold and below the second threshold. Accordingly, the first credential may comprise the code.

Similarly, the second credential may comprise a username and a password associated with the user. Alternatively or additionally, the first credential may comprise at least one biometric associated with the user.

In embodiments where the processor sends the code, the processor may send the code when the Lebesgue distance is above the second threshold. Accordingly, the second credential may comprise the code.

Although depicted as trifurcating, other variations of method 400 are possible. For example, method 400 may bifurcate such that the processor authenticates the user when the Lebesgue distance is below a threshold and prompts the user for a credential when the Lebesgue distance is above a threshold. In another example, method 400 may bifurcate such that the processor prompts the user for a first credential when the Lebesgue distance is below a threshold and prompts the user for a second credential when the Lebesgue distance is above a threshold.

In another variation, method 400 may use more than two thresholds. For example, the processor may authenticate the user when the Lebesgue distance is below a first threshold, may prompt the user for a first credential when the Lebesgue distance is above the first threshold and below a second threshold, may prompt the user for a second credential when the Lebesgue distance is above the second threshold and below a third threshold, and may prompt the user for a third credential when the Lebesgue distance is above the third threshold.

In some embodiments, one or more of the thresholds (such as the first threshold and/or the second threshold) may be dynamic. In certain aspects, the first threshold and/or the second threshold may be adjusted based on at least one of the first location and the second location. For example, the processor may decrease the first threshold and/or the second threshold if the first location is within a building. In other aspects, the first threshold and/or the second threshold may be adjusted based on one or more of the computer networks used to receive the first location and/or the second location. For example, the processor may increase the first threshold and/or the second threshold if the first location and the second location are received over the same WiFi network. In another example, the processor may decrease the first threshold and/or the second threshold if the first location and/or the second location are received over a public WiFi network.

In embodiments where one or more of the thresholds are dynamic, the processor may further access one or more stored IP addresses or other identifiers of at least a portion of the one or more computer networks over which locations may be received. Accordingly, the processor may adjust the first threshold and/or the second threshold based on one or more IP addresses from which and/or one or more computer networks over which the first location and/or the second location are received. For example, the processor may increase the first threshold and/or the second threshold if the IP address from which the first location is received matches a stored IP address and/or if the IP address from which the second location is received matches a stored IP address. In another example, the processor may increase the first threshold and/or the second threshold if one or more computer networks over which the first location is received has an associated identifier that matches a stored identifier and/or if one or more computer networks over which the second location is received has an associated identifier that matches a stored identifier. In yet another example, the processor may decrease the first threshold and/or the second threshold if the IP address from which the first location is received does not match a stored IP address and/or if the IP address from which the second location is received does not match a stored IP address. In a fourth example, the processor may decrease the first threshold and/or the second threshold if one or more computer networks over which the first location is received has an associated identifier that does not match a stored identifier and/or if one or more computer networks over which the second location is received has an associated identifier that does not match a stored identifier In any of the above embodiments, the credentials may increase in complexity and/or robustness. For example, the first credential may comprise a passcode or passphrase, the second credential may comprise a username and a password, and the third credential may comprise at least one biometric. In another example, the first credential may comprise a single credential such as a passcode or passphrase, and the second credential may comprise a plurality of credentials (e.g., as used in a two-factor authentication process). In yet another example, the first credential may comprise a single credential such as a passcode or passphrase, the second credential may comprise a plurality of credentials such as a username and password coupled with a code sent to the second interface device and/or to the first interface device, and the third credential may comprise a plurality of differing credentials such as a biometric coupled with a code sent to the second interface device and/or to the first interface device.

Method 400 may include additional steps. For example, the processor may receive the identity associated with the first user interface device from the first user interface device. Accordingly, the processor may receive confirmation of the identity of the first user interface device.

Additionally or alternatively, the processor may receive the identity associated with the second user interface device from the second user interface device. For example, the processor may receive confirmation of the identity of the second user interface device.

In some embodiments, the confirmation (from the first user interface device or the second user interface device) may comprise an authorization key. For example, the authorization key may be received from an application installed on the second user interface device and/or received from an application installed on the first user interface device. The application may be a standalone program or a plugin to another installed program, such as a plugin to a web browser.

Figure 5:
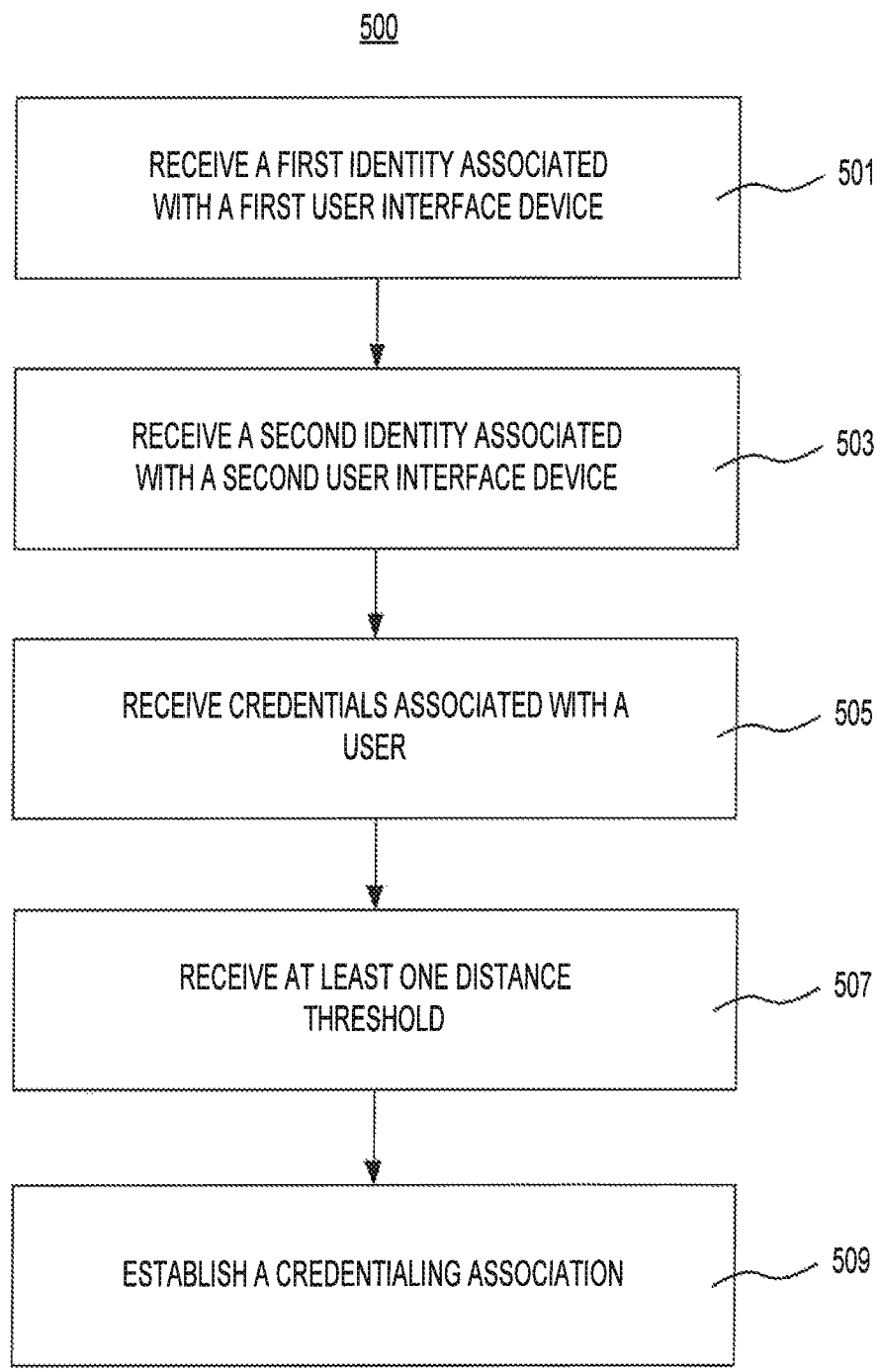
FIG. 5 is a flowchart of an exemplary method for associating two user interface devices to provide position-based authentication for a user, consistent with embodiments of the present disclosure.

FIG. 5 is a flowchart of an exemplary method 500 for associating two user interface devices to provide position-based authentication for a user. Method 500 may be implemented by, for example, one or more processors of authentication server 101 of FIG. 1 and/or server 800 of FIG. 8. Method 500 may further be implemented using a general purpose computer or special purpose computer having at least one processor.

At step 501, the processor receives a first identity associated with a first user interface device. For example, the first user interface device may comprise at least one of a smartphone, a tablet, or a personal computer.

At step 503, the processor receives a second identity associated with a second user interface device. For example, the second user interface device may comprise at least one of a smartphone, a tablet, or a personal computer.

Steps 501 and 503 may use one or more computers networks for transmission of the first identity and the second identity. For example, the first identity may be received over a first computer network, and the second identity may be received over a second computer network. In some embodiments, the second computer network may be at least partially separate from the first computer network. For example, the first computer network may comprise a 4G network or an LTE network connected to the Internet, and the second computer network may comprise a LAN or a WiFi network connected to the Internet.

In one example, at least one of the first identity or the second identity may comprise a media access control address of the associated user interface device. In another example, at least one of the first identity or the second identity may comprise an Internet protocol address of the associated user interface device. In a third example, at least one of the first identity or the second identity may comprise a serial number of a hardware device of the associated user interface device. For example, the hardware device may comprise at least one of a hard disk drive or a solid state drive, may comprise a motherboard, and/or may comprise a display.

In some embodiments, at least one of the first identity or the second identity may comprise a universally unique identifier of the associated user interface device. In such embodiments, the processor may generate the universally unique identifier and assign the universally unique identifier to at least one of the first user interface device and the second user interface device. In other embodiments, at least one of the first user interface device and the second user interface device may generate the universally unique identifier and self-assign the generated universally unique identifier. In yet other embodiments, a third party may generate the universally unique identifier and assign the universally unique identifier to at least one of the first user interface device and the second user interface device.

In some embodiments, at least one of the first identity and the second identity are associated with an application installed on the associated user interface device. For example, the application may be a standalone program or a plugin to another installed program, such as a plugin to a web browser.

At step 505, the processor receives credentials associated with the user. For example, the credential may comprise a username and a password or at least one biometric. The processor may receive the credentials from the first user interface device and/or the second user interface device. In some embodiments, the processor may receive the credentials over the first computer network and/or the second computer network. In other embodiments, the processor may receive the credentials over a third computer network. For example, the third computer network may comprise a local area network (LAN), a cellular network (e.g., 4G, LTE, or the like), the Internet, or the like. In some embodiments, the third computer network may be at least partially separate from the first computer network and/or the second computer network. For example, the third computer network may comprise an LTE network coupled to the Internet, and the second computer network and/or the first computer network may comprise a LAN coupled to the Internet. In certain aspects, the third computer network may be fully separate from the first computer network and/or the second computer network. For example, the third computer network may comprise a LAN, and the second computer network and/or the first computer network may comprise Bluetooth coupled to the Internet.

At step 507, the processor receives at least one distance threshold. For example, the at least one distance threshold may comprise a Euclidean distance, a rectilinear distance (e.g., based on mode of transportation and/or city layout), other relative distances such as the number of floors between locations if both locations are in the same building, geofencing-based distances such as whether the locations are in the same neighborhood, city, county, province, etc., or the like. In some embodiments, the at least one distance threshold may comprise a first threshold and a second, larger threshold.

At step 509, the processor establishes a credentialing association between the first identity and the second identity associated with the credentials and the at least one distance threshold. For example, the credentialing association may be established by storing the first identity, the second identity, and/or the at least one distance threshold in an authentication database indexed by user identifiers. Accordingly, a user of the first interface device and the second interface device may use the authentication database to process login requests. In certain aspects, the authentication database may be encrypted.

In embodiments where at least one of the first identity and the second identity are associated with an application installed on the associated user interface device, the processor may transmit an authorization key based on the credentialing association to the application. Alternatively, the processor may send the application to the associated user interface device for installation and may transmit an authorization key based on the credentialing association to the application.

Method 500 may include additional steps. For example, method 500 may include sending a code to at least one of the first user interface device and the second user interface device and prompting the user for the code before establishing the credentialing association. In such an example, the processor may prompt the user for the code to confirm that the user has access to the first user interface device and/or the second user interface device.

In another example, method 500 may include receiving at least one of a passcode or a passphrase and associating the received passcode or passphrase with the at least one distance threshold. Accordingly, the credentialing association may further include the passcode and/or passphrase, e.g., by storing the passcode and/or passphrase (or hashes thereof) in the authentication database.

The credentialing association established via method 500 may be used in method 400 for performing distance-based authorization. Accordingly, the at least one threshold of method 400 may comprise the first threshold and the second threshold of method 500.

Figure 6:
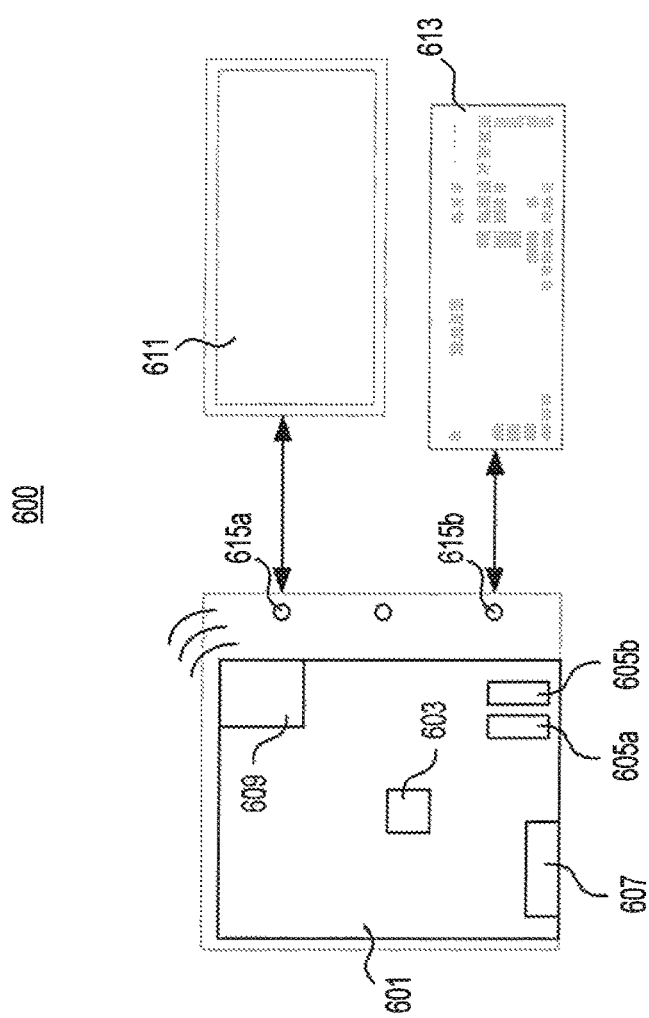
FIG. 6 is a depiction of an exemplary user interface device.

FIG. 6 is a depiction of an exemplary user interface device 600 for use by user 103 of system 100 of FIG. 1. For example, device 600 may comprise a desktop or laptop computer. As depicted in FIG. 6, device 600 may comprise a motherboard 601 having a processor 603, one or more volatile memories, e.g., memories 605a and 605b, a non-volatile memory 607, and a network interface 309. As further depicted in FIG. 6, a network interface 609 may comprise a wireless interface, e.g., a network interface card (NIC) configured to utilize Wi-Fi, Bluetooth, 4G, etc. In other embodiments, network interface 609 may comprise a wired interface, e.g., an NIC configured to utilize Ethernet, Token Ring, etc. In some embodiments, network interface 609 may permit device 600 to send information to and receive information from one or more computer networks.

In some embodiments, device 600 may further comprise one or more display modules, e.g., a display 611. For example, display 611 may comprise an LCD screen, an LED screen, or any other screen capable of displaying text and/or graphic content to the user. In some embodiments, display 611 may comprise a touchscreen that uses any suitable sensing technology, e.g., resistive, capacitive, infrared, etc. In such embodiments, display 611 may function as an input device in addition to an output module.

In some embodiments, device 600 may further comprise one or more user input devices, e.g., a keyboard 613 and/or a mouse (not shown). As further depicted in FIG. 6, the one or more display modules and one or more user input devices may be operably connected to motherboard 601 using hardware ports, e.g., ports 615a and 615b. For example, a hardware port may comprise a PS/2 port, a DVI port, an eSata port, a VGI port, an HDMI port, a USB port, or the like.

Device 600 need not include all components depicted in FIG. 6. Additionally, device 600 may include additional components not depicted in FIG. 6, e.g., external disc drives, graphics cards, etc.

Figure 7:
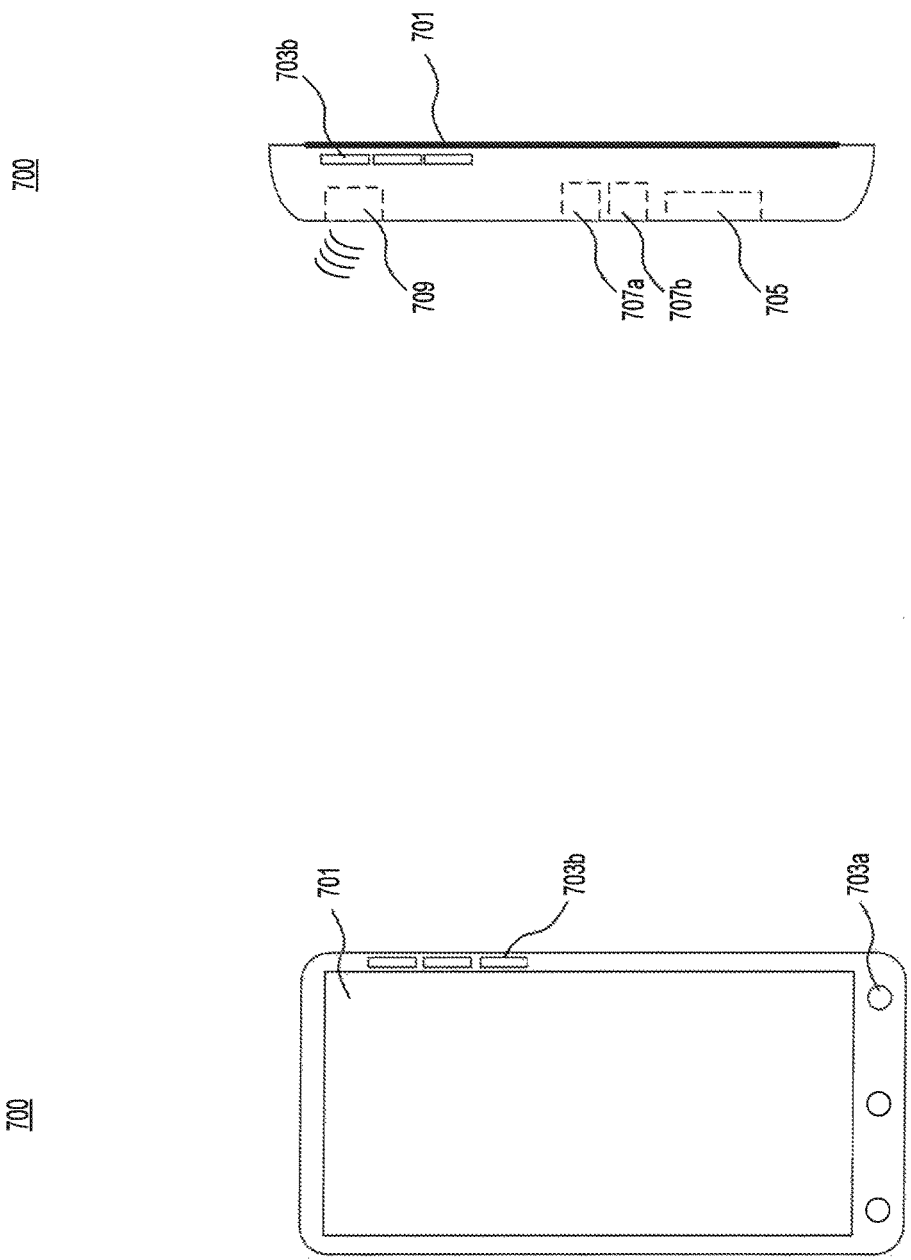
FIG. 7A is a depiction of another exemplary user interface device.
FIG. 7B is a side view of the device of FIG. 7A.

FIG. 7A is a depiction of an exemplary user interface device 700 for use by user 103 of system 100 of FIG. 1. As depicted in FIG. 7A, device 700 may comprise a smartphone or tablet. Device 700 may have a screen 701. For example, screen 701 may display one or more graphical user interfaces (GUIs) that allow a user of device 700 to send information to and receive information from one or more computer networks. In certain aspects, screen 701 may comprise a touchscreen to facilitate use of the one or more GUIs.

As further depicted in FIG. 7A, device 700 may have one or more buttons, e.g., buttons 703a and 703b. For example, buttons 703a and 703b may facilitate use of one or more GUIs displayed on screen 701.

FIG. 7B is a side view of user interface device 700 of FIG. 7A. As depicted in FIG. 7B, device 700 may have at least one processor 705. For example, at least one processor 705 may comprise a system-on-a-chip (SOC) adapted for use in a portable device, such as device 700. Alternatively or concurrently, at least one processor 705 may comprise any other type(s) of processor.

As further depicted in FIG. 7B, device 700 may include a network interface 709. For example, network interface 709 may comprise a wireless interface, e.g., a network interface card (NIC) configured to utilize Wi-Fi, Bluetooth, 4G, etc. In other embodiments, network interface 709 may comprise a wired interface, e.g., an NIC configured to utilize Ethernet, Token Ring, etc. In some embodiments, network interface 709 may permit device 700 to send information to and receive information from one or more computer networks.

As further depicted in FIG. 7B, device 700 may have one or more memories, e.g., memories 707a and 707b. In certain aspects, some of the one or more memories, e.g., memory 707a, may comprise a volatile memory. In such aspects, memory 707a, for example, may store one or more applications (or "apps") for execution on at least one processor 705. For example, an app may include an operating system for device 700 and/or an app for executing one or more steps of methods disclosed herein. In addition, an app may be used to send data to and receive data from one or more computer networks, e.g., data sent and received in accordance with one or more steps of methods disclosed herein. In addition, memory 707a may store data generated by, associated with, or otherwise unrelated to an app in memory 707a.

Alternatively or concurrently, some of the one or more memories, e.g., memory 707b, may comprise a non-volatile memory. In such aspects, memory 707b, for example, may store one or more applications (or "apps") for execution on at least one processor 705. For example, as discussed above, an app may include an operating system for device 700, an app for executing one or more steps of methods disclosed herein, and/or an app for sending data to and receiving data from one or more computer networks, e.g., data sent and received in accordance with one or more steps of methods disclosed herein. In addition, memory 707b may store data generated by, associated with, or otherwise unrelated to an app in memory 707b. Furthermore, memory 707b may include a pagefile, swap partition, or other allocation of storage to allow for the use of memory 707b as a substitute for a volatile memory if, for example, memory 707a is full or nearing capacity.

Figure 8:
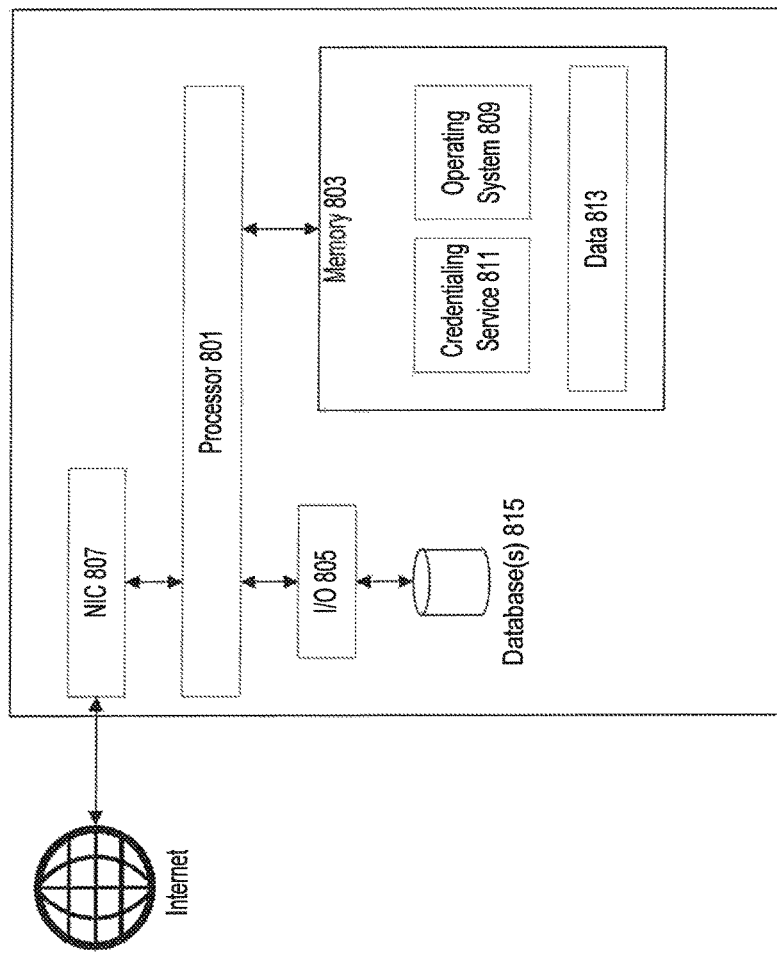
FIG. 8 is a depiction of an exemplary server for executing methods consistent with the present disclosure.

FIG. 8 is a depiction of an exemplary server 800 for use in authenticating a user with position-based credentials and/or associating two user interface devices to provide position-based authentication for a user. As depicted in FIG. 8, server 800 may have a processor 801. Processor 801 may comprise a single processor or a plurality of processors. For example, processor 801 may comprise a CPU, a GPU, a reconfigurable array (e.g., an FPGA or other ASIC), or the like.

Processor 801 may be in operable connection with a memory 803, an input/output module 805, and a network interface controller (NIC) 807. Memory 803 may comprise a single memory or a plurality of memories. In addition, memory 803 may comprise volatile memory, non-volatile memory, or a combination thereof. As depicted in FIG. 8, memory 803 may store one or more operating systems 809 and a credentialing service 811. For example, credentialing service 811 may include instructions to execute all or part of method 400 of FIG. 4 and/or method 500 of FIG. 5. Accordingly, processor 801 may execute all or part of method 400 of FIG. 4 and/or method 500 of FIG. 5. In addition, memory 803 may store data 813 produced by, associated with, or otherwise unrelated to operating system 809 and/or credentialing service 811.

An input/output module 805 may store and retrieve data from one or more databases 815. For example, database(s) 815 may include authentication information, whether encrypted or unencrypted. For example, as discussed above, one or more user interface identities, at least one distance threshold, etc., may be stored with an identification of a user in database(s) 815.

A NIC 807 may connect server 800 to one or more computer networks. In the example of FIG. 8, NIC 807 connects server 800 to the Internet. Server 800 may receive data and instructions over a network using NIC 807 and may transmit data and instructions over a network using NIC 807.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for associating two user interface devices to provide position-based authentication for a user, comprising:
   one or more memories storing instructions; and
   one or more processors configured to execute the instructions to perform operations, the processor, when executed, performing the operations comprising:
      receiving a first identity associated with a first user interface device;
      generating a first universally unique identifier for the first user interface device;
      sending a first application to the first user interface device, the first application including the first universally unique identifier;
      receiving a second identity associated with a second user interface device;
      generating a second universally unique identifier for the second user interface device;
      sending a second application to the second user interface device, the second application including the second universally unique identifier;
      receiving credentials associated with the user;
      receiving a distance threshold;
      establishing a credentialing association between the first application and the second application based on the first universally unique identifier, the second universally unique identifier, the credentials, and the distance threshold; and
      authorizing, based on the established credentialing association, use of the first application by the first user interface device or use of the second application by the second user interface device.

2. The system of claim 1, wherein at least one of the first identity or the second identity comprises a media access control address of the associated user interface device.

3. The system of claim 1, wherein at least one of the first identity or the second identity comprises an Internet protocol address of the associated user interface device.

4. The system of claim 1, wherein at least one of the first identity or the second identity comprises a serial number of a hardware device of the associated user interface device.

5. The system of claim 4, wherein the hardware device comprises at least one of a hard disk drive or a solid state drive.

6. The system of claim 4, wherein the hardware device comprises a motherboard.

7. The system of claim 4, wherein the hardware device comprises a display.

8. The system of claim 1, wherein the distance threshold comprises a first threshold and a second threshold.

9. The system of claim 1, wherein the credentials comprise a username and a password.

10. The system of claim 1, wherein the credentials comprise a biometric.

11. The system of claim 1, wherein the operations further comprise:
    sending a code to at least one of the first user interface device or the second user interface device, and
    prompting the user for the code before establishing the credentialing association.

12. The system of claim 1, wherein at least one of the first identity and the second identity are associated with an application installed on the associated user interface device.

13. The system of claim 12, wherein the operations further comprise transmitting an authorization key based on the credentialing association to the application.

14. The system of claim 12, wherein the operations further comprise:
    sending the application to the associated user interface device for installation, and
    transmitting an authorization key, based on the credentialing association, to the application.

15. The system of claim 1, wherein the operations further comprise:
    receiving at least one of a passcode or a passphrase, and
    associating the received passcode or passphrase with the distance threshold.

16. The system of claim 1, wherein the first user interface device comprises at least one of a smartphone, a tablet, or a personal computer.

17. The system of claim 1, wherein the second user interface device comprises at least one of a smartphone, a tablet, or a personal computer.

18. The system of claim 1, wherein the first identity is received over a first computer network, and the second identity is received over a second computer network at least partially separate from the first computer network.

19. A system for associating two user interface devices to provide position-based authentication for a user, comprising:
    one or more memories storing instructions; and
    one or more processors configured to execute the instructions to perform operations, the processor, when executed, performing the operations comprising:
       receiving a first identity associated with a first user interface device;
       generating a first quasi-unique identifier for the first user interface device;
       sending a first file to the first user interface device, the first file including the first quasi-unique identifier;
       receiving a second identity associated with a second user interface device;
       generating a second quasi-unique identifier for the second user interface device;

sending a second file to the second user interface device, the second file including the second quasi-unique identifier;
receiving credentials associated with the user;
receiving a distance threshold;
establishing a credentialing association between the first file and the second file based on the first quasi-unique identifier, the second quasi-unique identifier, the credentials, and the distance threshold;
authorize, based on the established credentialing association, storage of the first file by the first user interface device or storage of the second file by the second user interface device.

20. A system for associating two user interface devices to provide position-based authentication for a user, comprising:
one or more memories storing instructions; and
one or more processors configured to execute the instructions to perform operations, the processor, when executed, performing the operations comprising:
receiving a first identity associated with a first user interface device;
generating a first quasi-unique identifier for the first user interface device;
sending data associated with a first plugin to the first user interface device, the first plugin including the first quasi-unique identifier;
receiving a second identity associated with a second user interface device;
generating a second quasi-unique identifier for the second user interface device;
sending data associated with a second plugin to the second user interface device, the second plugin including the second quasi-unique identifier;
receiving credentials associated with the user;
receiving a distance threshold;
establishing a credentialing association between the first plugin and the second plugin based on the first quasi-unique identifier, the second quasi-unique identifier, the credentials, and the distance threshold; and
authorizing, based on the established credentialing association, use of the first plugin by the first user interface device or use of the second plugin by the second user interface device.

* * * * *